(12) United States Patent  (10) Patent No.: US 9,166,357 B1
Moulton et al.  (45) Date of Patent: Oct. 20, 2015

(54) FIBER LASER SYSTEM AND METHOD

(71) Applicant: Q-Peak, Incorporated, Bedford, MA (US)

(72) Inventors: Peter Moulton, Concord, MA (US); Evgueni Slobodtchikov, Lexington, MA (US); Yelena Isyanova, Chestnut Hill, MA (US)

(73) Assignee: Q-Peak, Incorporated, Bedford, MA (US)

( * ) Notice: Subject to any disclaimer, the term of this patent is extended or adjusted under 35 U.S.C. 154(b) by 0 days.

(21) Appl. No.: 14/660,265

(22) Filed: Mar. 17, 2015

(51) Int. Cl.
*H01S 3/30* (2006.01)
*H01S 3/094* (2006.01)
*H01S 3/16* (2006.01)
*H01S 3/067* (2006.01)

(52) U.S. Cl.
CPC ........... *H01S 3/094042* (2013.01); *H01S 3/067* (2013.01); *H01S 3/06716* (2013.01); *H01S 3/094003* (2013.01); *H01S 3/094007* (2013.01); *H01S 3/1616* (2013.01); *H01S 3/1655* (2013.01)

(58) Field of Classification Search
CPC ................ H01S 3/067; H01S 3/06716; H01S 3/094003; H01S 3/094007; H01S 3/094042; H01S 3/1616
USPC ....................................... 372/6, 70
See application file for complete search history.

(56) References Cited

U.S. PATENT DOCUMENTS

| 7,593,435 | B2 | 9/2009 | Gapontsev et al. | |
|---|---|---|---|---|
| 7,848,368 | B2 | 12/2010 | Gapontsev et al. | |
| 8,611,003 | B2 | 12/2013 | Ahn et al. | |
| 2007/0002905 | A1* | 1/2007 | Budni | H01S 3/06716 372/6 |
| 2011/0064096 | A1* | 3/2011 | Shah | G02F 1/39 372/6 |
| 2011/0150011 | A1 | 6/2011 | Young et al. | |
| 2012/0314279 | A1 | 12/2012 | Grudinin et al. | |
| 2013/0322470 | A1* | 12/2013 | Creeden | H01S 3/0675 372/6 |

OTHER PUBLICATIONS

Ehrenreich et al., "1-kW, All-Glass Tm: Fiber Laser", SPIE Photonics West 2010: LASE, Fiber Lasers VII: Technology, Systems, and Applications, Conference 7580, Session 16: Late-Breaking News, Jan. 28, 2010, 15 pages.
Creeden et al., "Resonantly Pumped Tm-Doped Fiber Laser With >90% Slope Efficiency", Optics Letters, vol. 39, No. 3, Feb. 1, 2014, pp. 470-473.
Creeden et al., "High Power Resonant Pumping of Tm-Doped Fiber Amplifiers in Core- and Cladding-Pumped Configurations", Optics Express 29067, Nov. 17, 2014, vol. 22, No. 23, 14 pages.
Yoo et al., "Minimize Quantum-Defect Heating in Thulium-Doped Silica Fiber Amplifiers by Tandem-Pumping", Photonics Global Conference, Singapore, Dec. 13-16, 2012, 3 pages.

(Continued)

*Primary Examiner* — Kinam Park
(74) *Attorney, Agent, or Firm* — Iandiorio Teska & Coleman, LLP

(57) ABSTRACT

A fiber laser system includes at least one optical fiber with a core and a cladding and is operative at a first wavelength larger than 2000 nm. The operative first wavelength is preferably chosen to maximize transmission through the atmosphere. At least one optical pumping system includes one or more pumping fiber lasers also doped with thulium for pumping the optical fiber. The pumping system is operative at a second, shorter wavelength close to the first wavelength for low quantum defect pumping. The core of the optical fiber is doped with thulium at a doping concentration greater than one weight % to reduce absorption losses in the core.

12 Claims, 12 Drawing Sheets

(56) References Cited

OTHER PUBLICATIONS

Brown et al., "Thermal, Stress, and Thermo-Optic Effects in High Average Power Double-Clad Silica Fiber Lasers", IEEE Journal of Quantum Electronics, vol. 37, No. 2, Feb. 2001, pp. 207-217.

Payne, David N., "Fiber Lasers: The Next Generation", Optoelectronics Research Centre and SPI Lasers, Plenary Paper, CLEO 2006, May 22, 2006, Long Beach, CA, 36 pages.

Bowman et al., "Ytterbium Laser With Reduced Thermal Loading", IEEE Journal of Quantum Electronics, vol. 41, No. 12, Dec. 2005, pp. 1510-1517.

Minnelly et al., "TuG2 High-Gain Fiber Power Amplifier Tandem-Pumped by a 3-W Multistripe Diode", OSA/OFC 1992, 2 pages.

Moulton et al., "Tm-Doped Fiber Lasers: Fundamentals and Power Scaling", IEEE Journal of Selected Topics in Quantum Electronics, vol. 15, No. 1, Jan./Feb. 2009, pp. 85-92.

Mochizuki et al., "Behavior of Hydrogen Molecules Adsorbed on Silica in Optical Fibers", IEEE Journal of Quantum Electronics, vol. QE-20, No. 7, Jul. 1984, pp. 694-697.

Rothman, et al., "The HITRAN2012 Molecular Spectroscopic Database", Journal of Quantitative Spectroscopy & Radiative Transfer, 130, 2013, pp. 4-50.

IPG Photonics Inc., Webster, MA, "Model YLS-100000 Laser", http://www.ipgphotonics.com, pp. 1-2 and pp. 1-16, Jun. 22, 2015.

* cited by examiner

FIBER LASER SYSTEM AND METHOD

GOVERNMENT RIGHTS

This invention was made with U.S. Government support under BAA Contract No. FA9451-08-D-0199/0002 NAVSEA Phase 1 SBIR Program Contract No. N65538-08-M-0017 and NAVSEA Phase II SBIR Program Contract No. N00024-10-C-4107 awarded by the Navy. The Government may have certain rights in the subject invention.

FIELD OF THE INVENTION

The subject invention relates to a fiber laser pumped optical fiber laser system useful in high-power, directed-energy systems, laser radar, and other applications.

BACKGROUND OF THE INVENTION

High power fiber lasers are being developed for applications such as industrial laser materials processing (e.g., metal cutting and welding) and military directed-energy and laser radar systems. IPG Photonics, Inc. (Oxford, Mass.), for example, has produced a 10-kW-cw-power YLS-10,000-SM fiber laser based on ytterbium-doped silica fibers operating around 1070 nm. See U.S. Pat. Nos. 7,593,435 and 7,848,368 incorporated herein by this reference.

There is concern, however, that such high-power lasers, operating at wavelengths less than about 1400 nm, can cause eye damage to personnel subject to stray power from lasers, since even a small fraction of the power can be focused onto and cause damage to the retina.

SUMMARY OF THE INVENTION

Lasers operating at longer wavelengths than about 1400 nm present a greatly reduced risk of eye damage since their power is absorbed inside the eye before it reaches the retina.

Thulium doped fiber lasers operate in the eye-safe region around 1800-2100 nm and thus are desirable for many applications that project laser power through the atmosphere, such as directed-energy and laser radar systems. Unfortunately, thulium doped fiber lasers have a peak emission (highest gain) at wavelengths strongly absorbed in the atmosphere. At these wavelengths the useful range of operations in the atmosphere would be severely limited. However, the thulium fiber-laser output may be tuned to wavelengths longer than the peak emission region to emit at wavelengths not strongly absorbed in the atmosphere (e.g., longer than 2020 nm, with 2037 nm being one of the most desirable).

A thulium-doped fiber laser can be optically pumped by another thulium-doped fiber laser in a low-quantum-defect configuration to minimize thermal heating of the fiber and thus generate higher-power outputs than possible with pumping based on 790-nm diode lasers. See, for example, U.S. Patent Application No. 2013/0322470 incorporated herein by this reference.

In combining the use of low-quantum-defect operation with the desire to operate at wavelengths with high atmospheric transmission, the thulium fiber laser would need to be pumped at a wavelength close to its desired emission wavelengths (e.g. 2037 nm), for example, a pumping wavelength between about 1940 nm and 1980 nm.

However, using 2037 nm and similar long-wavelengths for operation of thulium-doped silica and silica-based glasses, the low-quantum-defect approach can lose effectiveness in terms of efficiently converting pump power into output power. The loss of effectiveness can be due to the presence of appreciable, fundamental absorption losses in the silica and silica-based glass used to make the fiber lasers. Due to the relatively low gain per unit length associated with low-quantum-defect pumping, the fundamental losses have a much larger undesirable impact on efficiency compared to more conventional pumping techniques. While other base glasses can be used, other glasses can have substantially inferior thermo-mechanical properties compared to silica-based glasses. Silica-based fibers can be most commonly used in 100 W power or greater fiber laser applications. Therefore, it is desirable to overcome the effects of absorption losses present in silica glasses and obtain efficient, high-power fiber laser operation at the desirable long wavelengths required for high atmospheric transmission.

In one example of the invention, a thulium doped optical fiber is pumped using a thulium doped fiber laser pumping system to produce an eye-safe, high power laser system. The laser output is tuned to maximize transmission in the atmosphere. The pumping laser wavelength is tuned to be close to the pumped laser output wavelength for a low quantum defect. The effects of silica-based-glass absorption losses are decreased by using high levels of doping in the optical fiber. Preferably, the doping concentration in the optical fiber core is equal to or greater than 4.5%.

One advantage of embodiments of the invention is a low-quantum-defect, efficient, long-wavelength thulium-doped fiber laser that can reduce a fractional amount of heat generated in a thulium-doped fiber for a given output power. For example, a thulium-doped fiber pump source can operate with a wavelength very close to that of the thulium-doped fiber laser, thereby reducing a quantum defect between pump and laser photons. Reducing the quantum defect can result in a decreased ratio of heat power dissipated in the thulium-doped fiber to laser output power and an increased limit to the output power controlled by thermal effects in the thulium-doped fiber.

Another advantage of embodiments of the invention is that it is designed to take into account background absorption of a silica fiber. The operating characteristics of a low-quantum-defect thulium-doped fiber laser can be significantly different from more conventional thulium-doped fiber lasers and require an appropriate balance among a variety of fiber-laser parameters. For example, the background absorption of the silica fiber can be accounted for to optimize a doping concentration in the core of the silica fiber.

In some embodiments of the invention, a low-quantum-defect thulium-doped fiber laser operates at 2037 nm and is pumped at 1940 nm by one or more thulium-doped fiber lasers. Operation at such wavelengths can be crucial to achieving the high atmospheric transmission required in applications such as laser radar or directed energy systems for defense.

Another advantage of embodiments of the invention is that high power and a high efficiency output can be achieved. For example, a combination of pump and laser wavelengths can generate up to 35 kW of power output, exceeding the 10 kW level that can be achieved with present commercially available ytterbium-doped fiber lasers.

In one aspect, the invention includes a fiber laser system. The fiber laser system includes at least one silica-glass-based optical fiber having a core and a cladding. The core is doped with thulium at a doping concentration greater than 1 weight percent. The at least one optical fiber is operative at a first wavelength that is longer than 2000 nm. At least one optical pumping system delivers power to the at least one optical fiber and includes one or more pumping fiber lasers doped with thulium. The one or more pumping fiber lasers are operative at a second wavelength that is shorter than the first wavelength.

In some embodiments, the doping concentration is greater than or equal to 4.5 weight percent. In some embodiments, the first wavelength is 2037 nm. In some embodiments, the second wavelength is 1940 nm. In some embodiments, the second wavelength is 1980 nm.

In various embodiments, the at least one optical pumping system delivers power to the at least one optical fiber via the core. In some embodiments, the at least one optical pumping system delivers power to the at least one optical fiber via the cladding.

In another aspect, the invention includes a method of efficiently generating high power in a fiber. The method involves doping a core of at least one optical fiber with thulium at a doping concentration greater than 1 weight percent. The method also involves operating the at least one optical fiber at a first wavelength longer than 2000 nm. The method also involves operating one or more pumping fiber lasers at a second wavelength shorter than the first wavelength. The method further involves pumping the at least one optical fiber with the one or more pumping fiber lasers.

In various embodiments, pumping the at least one optical fiber with the one or more pumping fiber lasers further involves delivering power to the at least one optical fiber via the core. In some embodiments, pumping the at least one optical fiber with the one or more pumping fiber lasers further involves delivering power to the at least one optical fiber via a cladding surrounding the core.

In another aspect, the invention includes a method of efficiently generating high power in a fiber. The method involves doping a core of at least one optical fiber comprising silica or silica-based glass with thulium at a doping concentration greater than or equal to 4.5 weight percent. The method also involves operating the at least one optical fiber at a first wavelength longer than 2000 nm. The method also involves operating one or more pumping fiber lasers at a second wavelength shorter than the first wavelength. The method further involves pumping the at least one optical fiber with the one or more pumping fiber lasers.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
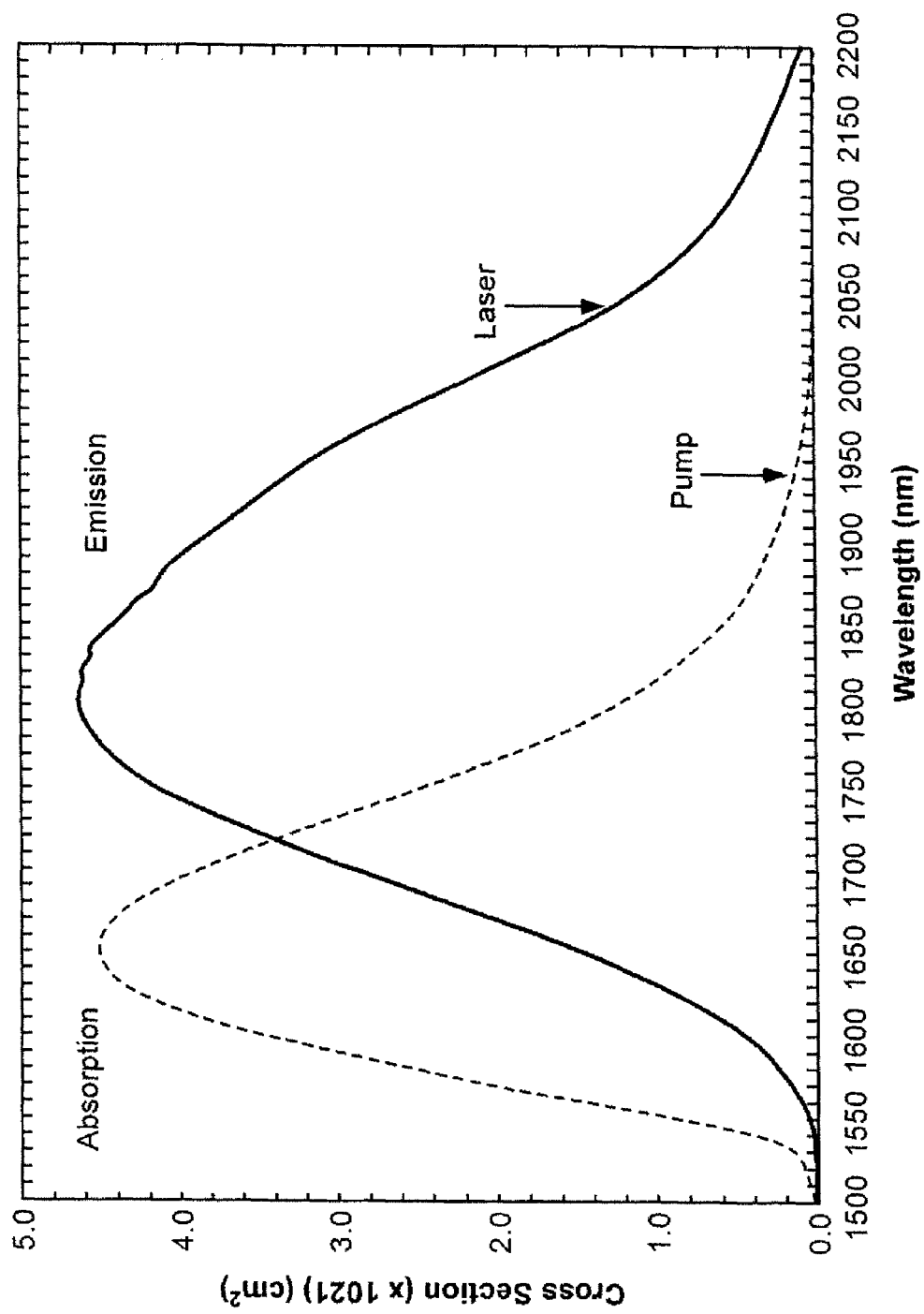
FIG. 1 is a graph showing absorption and emission cross sections of thulium-doped silica material over wavelength.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As noted above, a thulium doped optical fiber emits radiation at wavelengths greater 1400 nm and thus are considered eye-safe which is desirable in directed energy and laser radar systems. In a typical design, the pump wavelength would be chosen at the peak of the absorption cross section (around 1650 nm). The operating wavelength range, in the case of a fiber-based oscillator, is determined by the tuning optics used in the system as well by the details of the fiber-laser configuration, and is typically in the 1900-2000-nm region.

Figure 2:
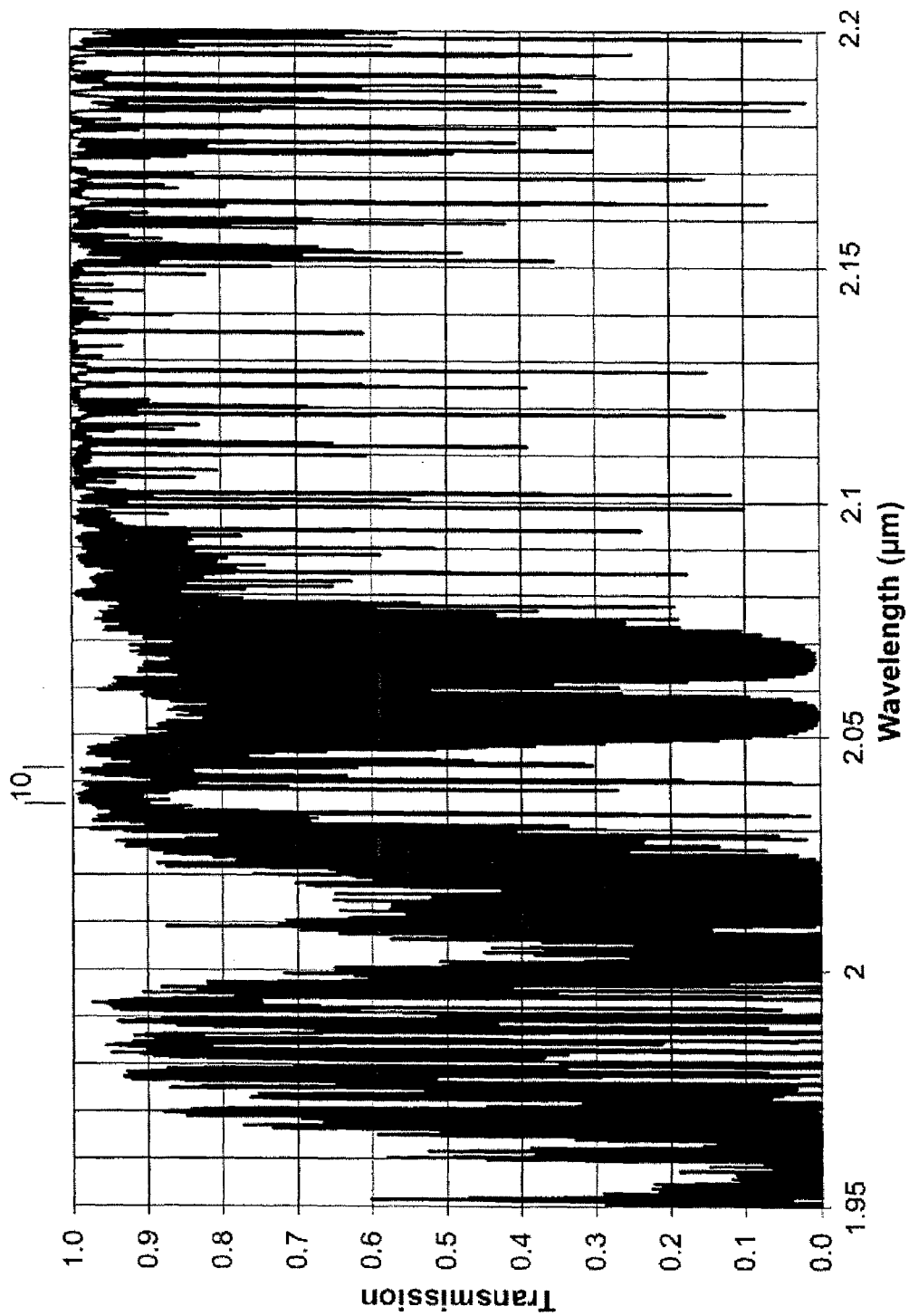
FIG. 2 is a graph showing atmospheric transmission at sea level over wavelength calculated from 1950 to 2200 nm.
Figure 3:
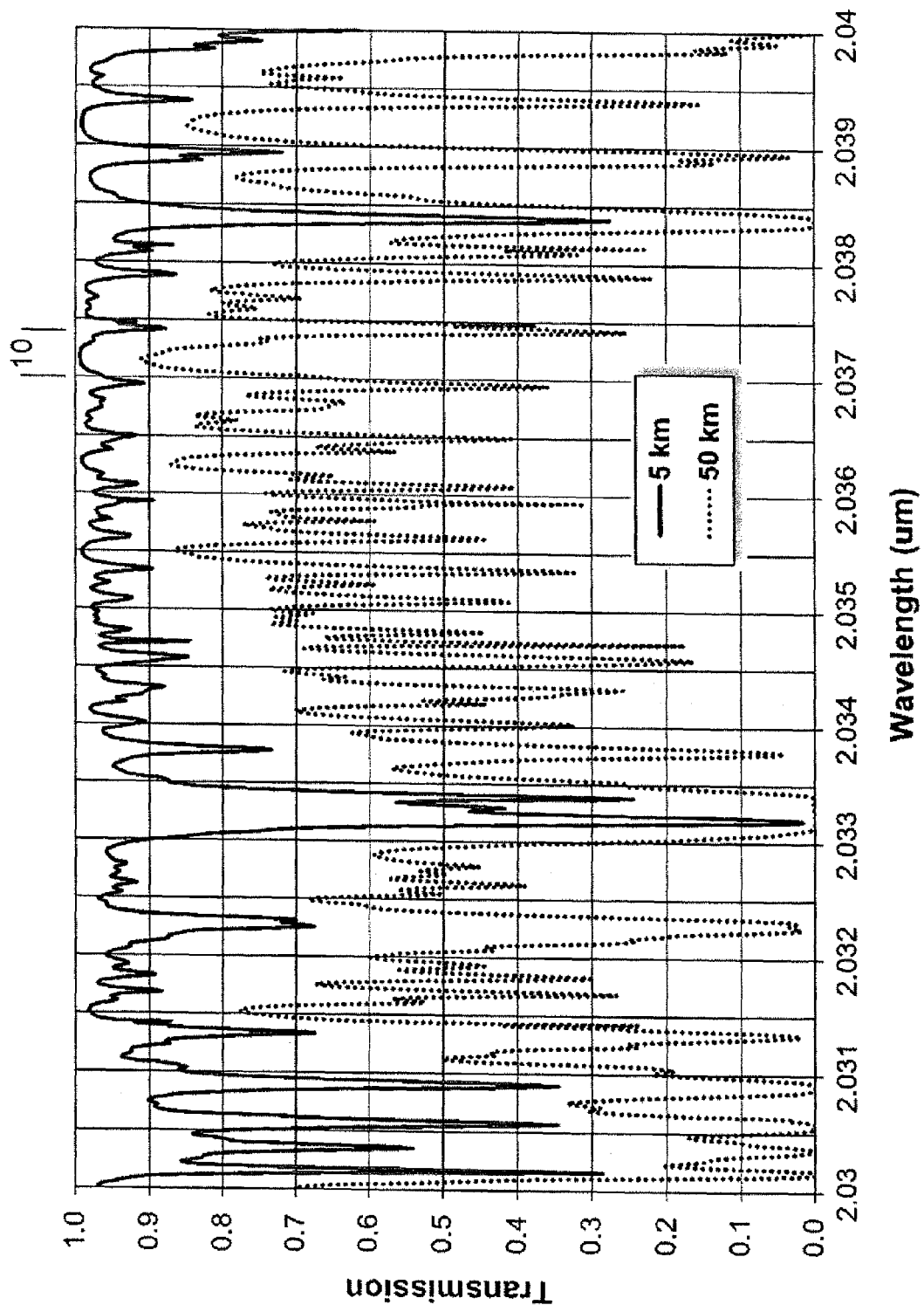
FIG. 3 is a graph showing atmospheric transmission at sea level over wavelength calculated from 2030 to 2040 nm.

However, laser radar and directed-energy systems are expected to transmit efficiently in the atmosphere and, as shown in FIGS. 2-3, wavelengths where the emission cross section is high, from FIG. 1, result in transmission losses in the atmosphere. Typically, these shorter wavelengths (below about 2020 nm) provide poorer transmission in the atmosphere.

To achieve a transmission coefficient in the atmosphere of approximately 0.97 or greater as shown in region 10 of FIGS. 2-3, the corresponding wavelength chosen is approximately 2037 nm for maximum transmission over 5 km and 50 km.

In the subject design the optical fiber is pumped by an optical pumping system including one or more thulium doped pumping lasers. The pumping fiber lasers of the pumping system are operative at a wavelength less than but close to the operative wavelength of the optical fiber to reduce the quantum defect. Thus, a pump wavelength of 1940 nm is chosen in one example to reduce the quantum defect for fiber-laser operation at 2037 nm. Typically, the difference between the pumping wavelength and the optical fiber operating wavelength is less than about 100 nm.

Figure 4:
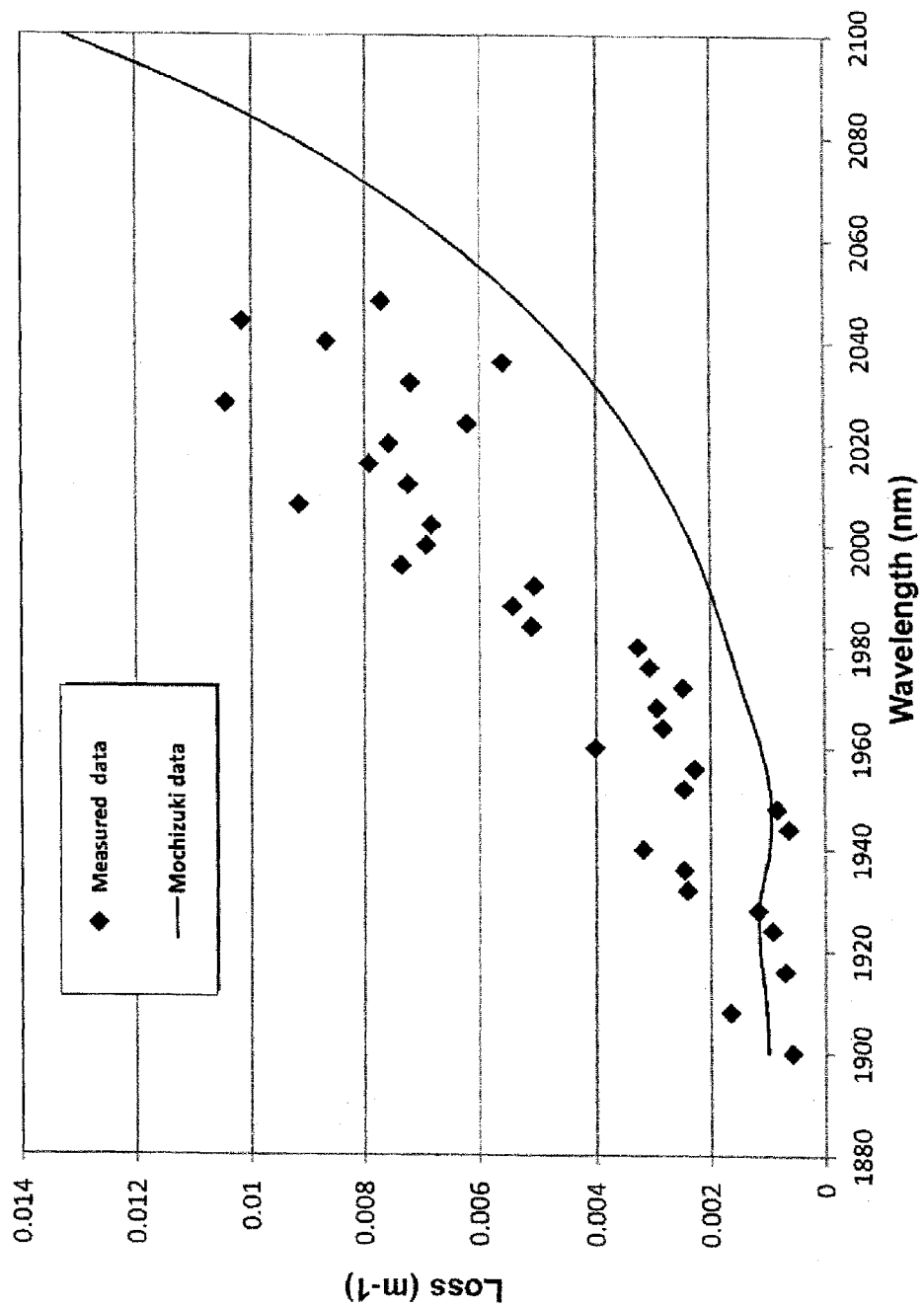
FIG. 4 is a graph showing the absorption coefficient of the background absorption loss in silica-based fiber over wavelength.

But, as shown in FIG. 1, operating the optical fiber at 2037 nm while pumping it at 1940 nm results in both a low emission cross section for the 2037 nm laser wavelength and a low absorption cross section for the pump at 1940 nm. In addition, since the emission cross section is much higher than that of the absorption cross section at the pump wavelength, the maximum possible fractional inversion possible, given by the ratio of the absorption cross section to the sum of the emission and absorption cross sections, is small, about 4%. In the absence of any other losses in the fiber, these conditions lead to a low absorption and low gain coefficients per unit length of fiber. This problem could be addressed by increasing the length of the fiber used in the system, such that the pump power would be fully absorbed over the length of the fiber and the net gain would be increased as well. However, in silica, or silica-based glass fibers there is other "background" loss that must be taken into account. For example, FIG. 4 is a graph showing absorption coefficient of the background absorption loss in silica-based fiber over wavelength where the solid line is absorption data taken by Mochizuki et al. in telecom-grade (e.g., 0.3 dB/km loss at 1550 nm wavelength) fused silica fiber, with a germanium-doped, 50 um core. The plotted points in FIG. 4 are measurements of absorption carried out of a Nufern-manufactured, 31-m in length, 25-um-in-diameter core fiber with a modest level of germanium doping in the core to provide the necessary index step for guiding. The scatter in the measured data is from experimental error and the generally higher loss can be due to a higher OH impurity content in the tested fiber. The data illustrates that, as wavelength increases beyond about 1950 nm, the absorption in silica also increases. The absorption is due to fundamental vibrational transitions in the silica or silica-based glass, as well as that due to the inevitable presence of some amount of OH impurities.

When the fiber losses are included in the design of a Tm:fiber system, calculations show that the efficiency of the system is reduced, since the net gain in power per unit length from laser action competes now with the loss per unit length due to the background loss. The solution to the reduced efficiency, in one preferred embodiment, is to use a much higher level of Tm ion concentration in the fiber core than would be customary for a fiber pumped around the peak absorption cross section wavelength. This leads to much higher gain per unit length and increases the laser efficiency to approach the level possible if there was no fiber loss in the laser wavelength region.

Figure 5:
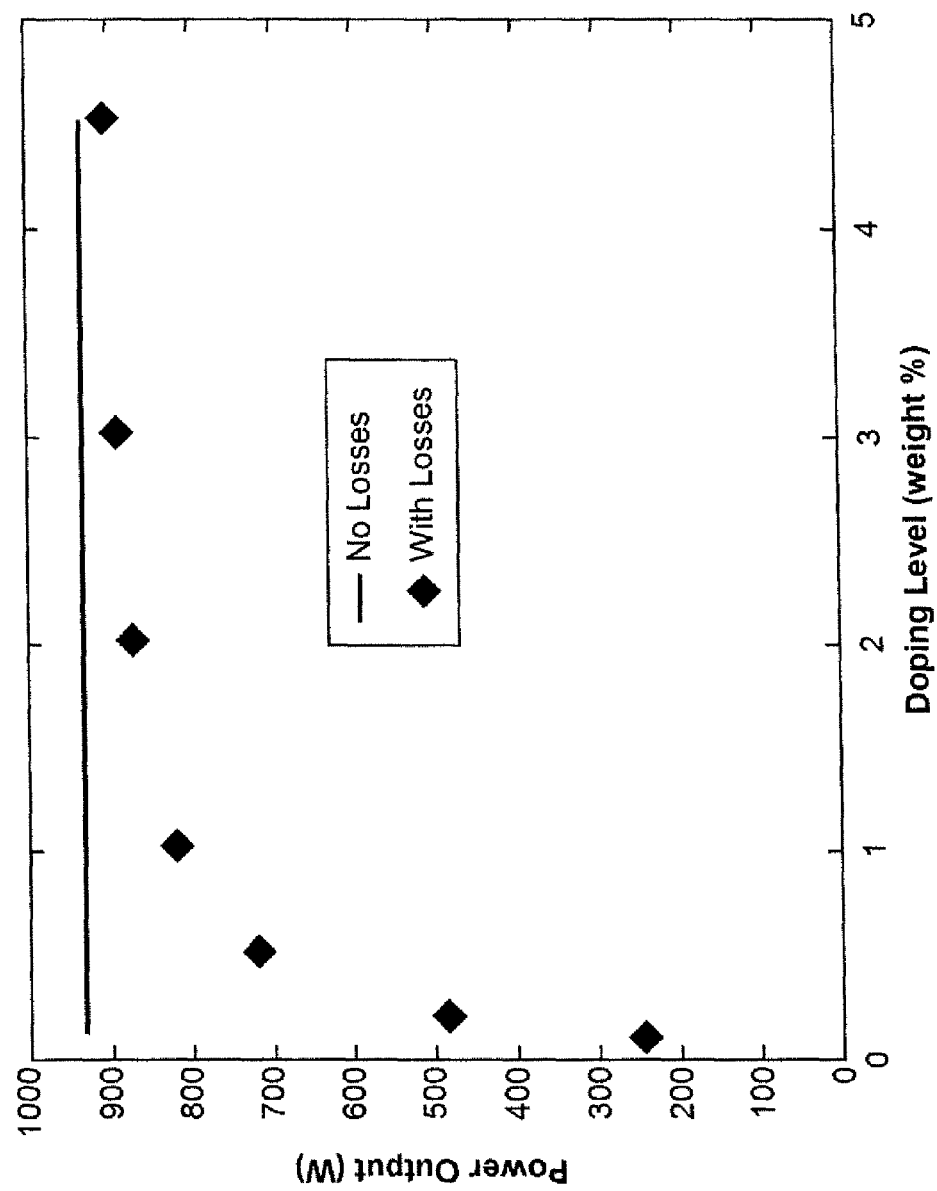
FIG. 5 is a graph showing power output from a model core-pumped low quantum defect fiber laser amplifier over doping level according to an illustrative embodiment of the invention.

FIG. 5 is a graph showing power output from a model core-pumped low quantum defect thulium-doped fiber laser amplifier over doping level. For each doping level the length of the fiber is adjusted to maximize the power output, with the result that longer fibers are employed as the doping level is reduced. In FIG. 5, the pumping fiber laser is operating at a wavelength of 1940 nm and power of 1000 W. The thulium-doped fiber laser is operating at a wavelength of 2037 nm. With no background fiber loss at either the pumping fiber laser or the thulium-doped fiber laser, the power output is independent of doping level. When losses are included, the performance of thulium-doped silica fiber laser model shows dependence on the doping level. Doping levels greater than 1 weight percent result in power output closest to the no-loss fiber case. At a doping level of 1 weight percent, the thulium-doped fiber laser power output is approximately 840 W where the thulium-doped fiber length is 27 m. At the high doping level of 4.5 weight percent, the thulium-doped fiber laser power output is approximately 933 W where the thulium-doped fiber length is 6 m. This output power of 933 W is close to the upper level set by the quantum limit of 95.2% (1940 nm wavelength/2037 nm wavelength) conversion of pumping fiber laser power to thulium-doped fiber laser output power.

Figure 6:
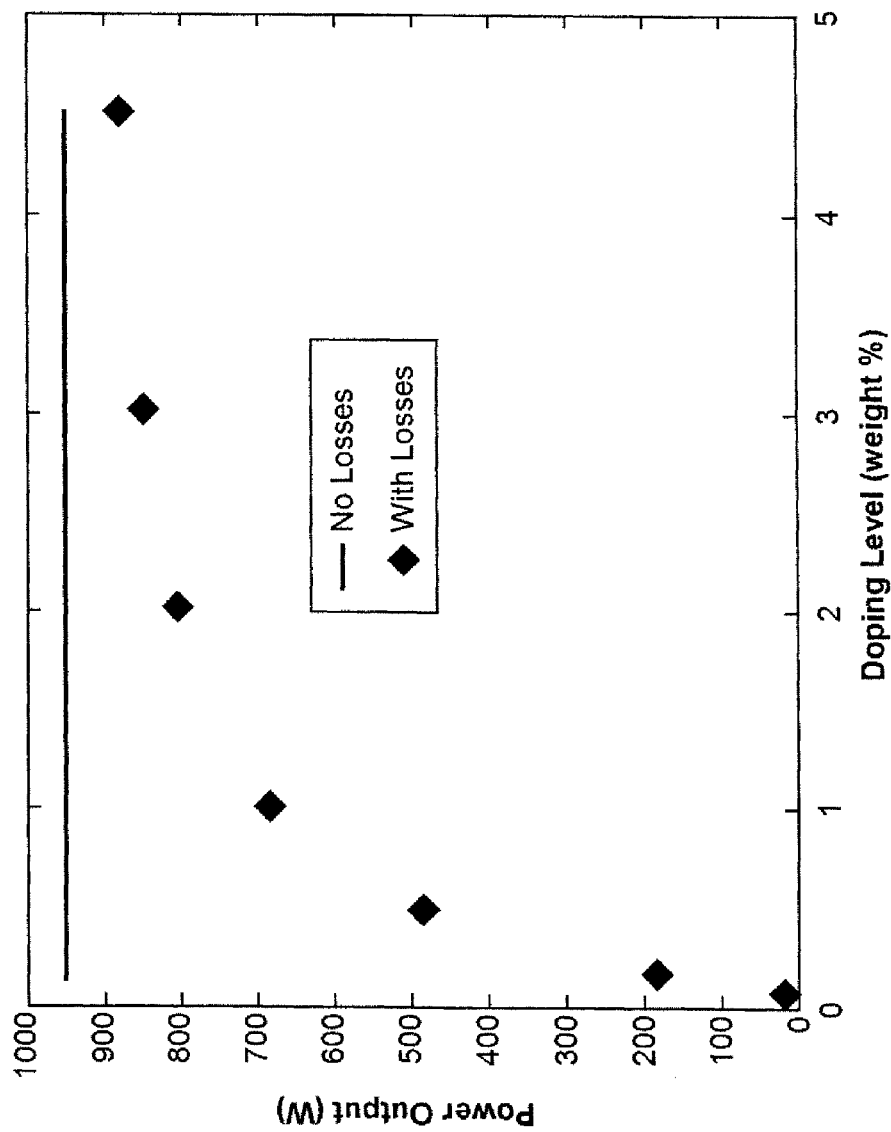
FIG. 6 is a graph showing power output from a model core-pumped low quantum defect fiber laser amplifier over doping level according to an illustrative embodiment of the invention.

FIG. 6 is a graph showing power output from a model core-pumped low quantum defect thulium-doped fiber laser amplifier over doping level where the pumping fiber laser is operating at a wavelength of 1980 nm (to reduce even further the quantum defect) and power of 1000 W. The thulium-doped fiber laser is operating at a wavelength of 2037 nm. From the smaller quantum defect, we observe a higher power output with no loss included (952 W). At a doping level of 1 weight percent, the optimized thulium-doped fiber laser power output is approximately 680 W where the thulium-doped fiber length is 67 m. At a doping level of 4.5 weight percent, the thulium-doped fiber laser power output is approximately 883 W where the thulium-doped fiber length is 15 m.

Figure 7:
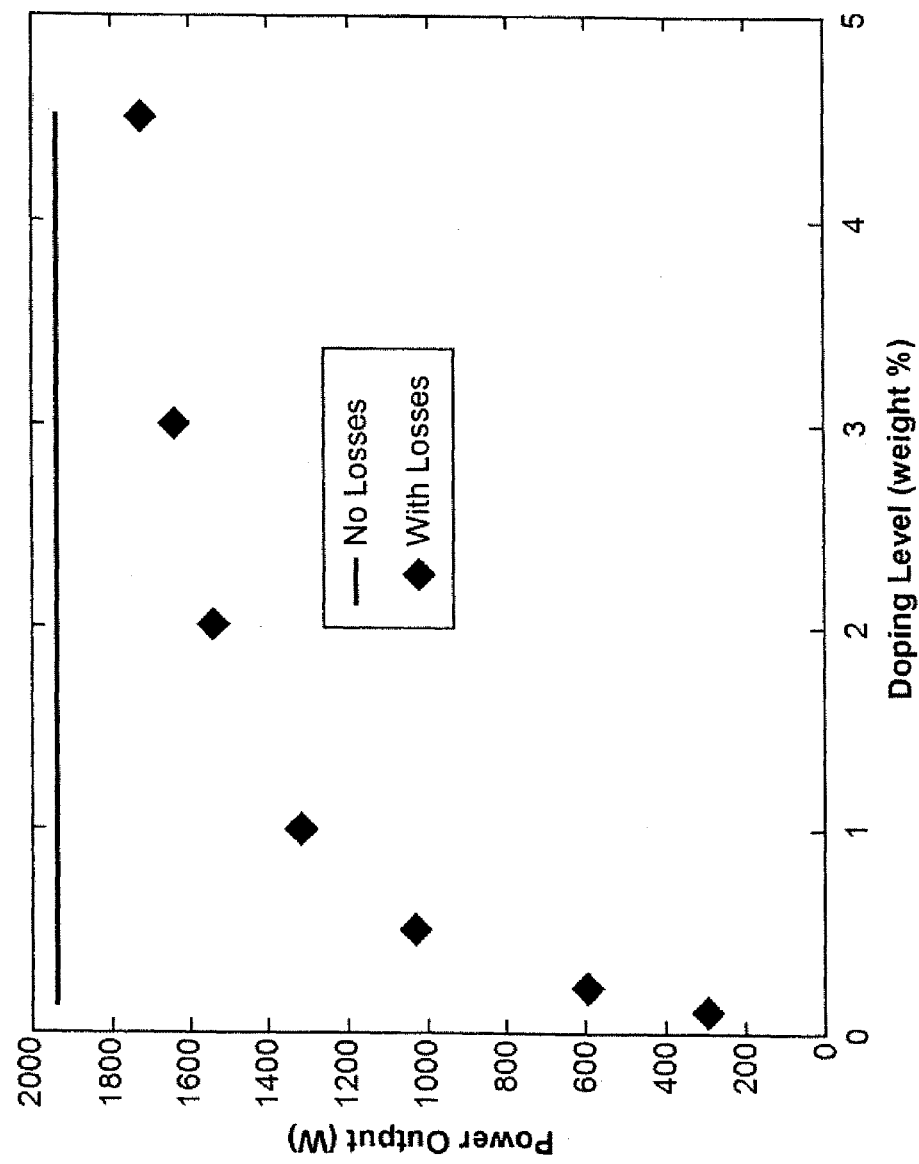
FIG. 7 is a graph showing power output from a model cladding-pumped low quantum defect fiber laser amplifier over doping level according to an illustrative embodiment of the invention.

FIG. 7 is a graph showing power output from a model cladding-pumped low quantum defect thulium-doped fiber laser amplifier over doping level, according to an illustrative embodiment of the invention. In FIG. 7, the pumping fiber laser is operating at a wavelength of 1940 nm and total power of 2000 W, with 1000 W pumped to each end of the thulium-doped fiber laser. The thulium-doped fiber laser is operating at a wavelength of 2037 nm. The cladding of the thulium-doped fiber laser has a diameter of 100 um. With no fiber loss, the power output is 1932 W, independent of doping level. At a doping level of 1 weight percent, the thulium-doped fiber laser power output is approximately 1310 W where the thulium-doped fiber length is 70 m. At a doping level of 4.5 weight percent, the thulium-doped fiber laser power output is approximately 1717 W where the thulium-doped fiber length is 23 m.

Figure 8:
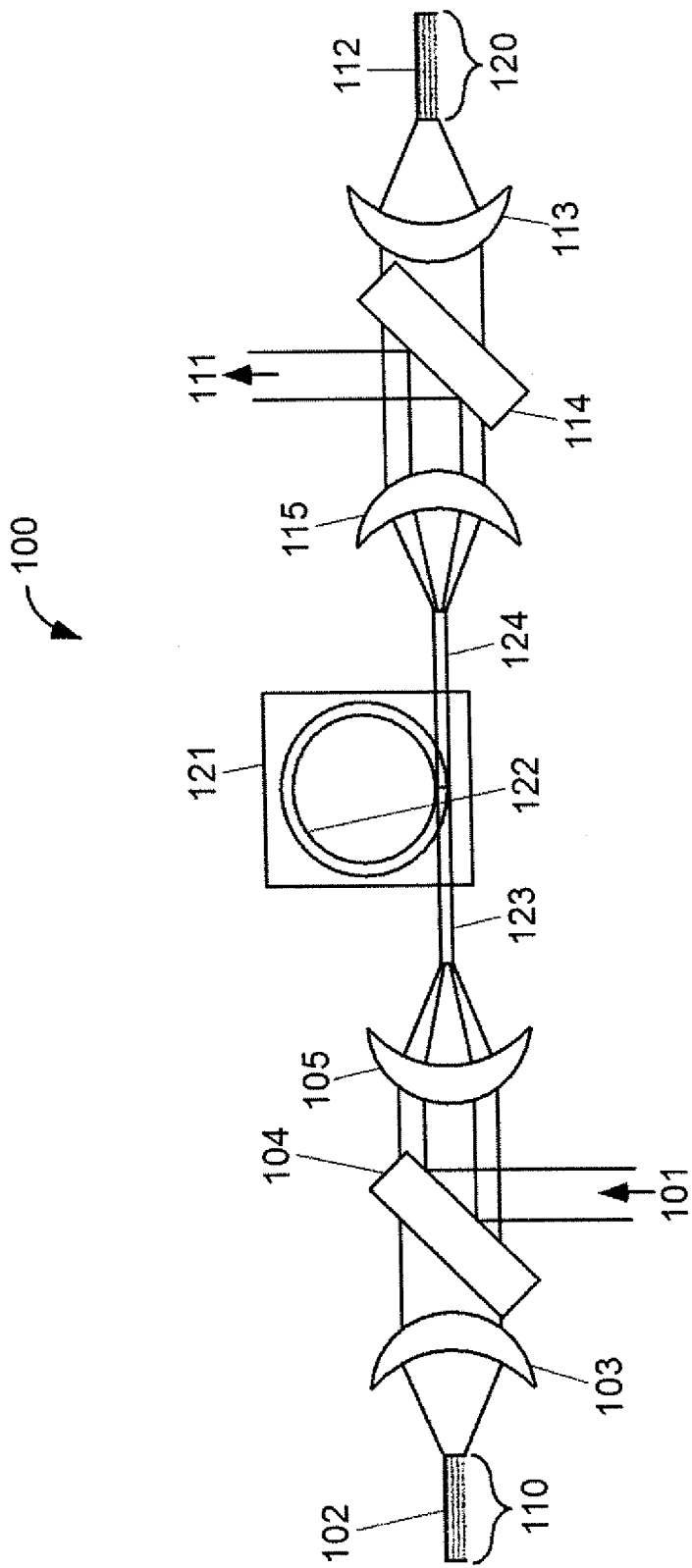
FIG. 8 is a schematic representation of several of the components of a low quantum defect thulium-doped fiber laser amplifier system according to an illustrative embodiment of the invention.

FIG. 8 is a schematic representation of a low quantum defect thulium-doped fiber laser amplifier system 100 according to an illustrative embodiment of the invention. The system 100 preferably includes an optical pumping system 110 and 120, a pump lens 103, a dichroic mirror 104, an input lens 105, a pump lens 113, a dichroic mirror 114, an output lens 115, and a thulium-doped optical fiber 122.

The system 100 preferably includes a length of optical fiber 122 coiled on a heat sink 121. Optical fiber 122 may comprise a core 200, FIG. 9, an inner, undoped pump cladding 202, an outer glass cladding 203, and protective low index polymer coating 204. The core of optical fiber 122 is doped with thulium at a doping concentration greater than 1 weight percent. In some embodiments, the optical fiber 122 is a silica-based material. In various embodiments, the doping concentration of the core of optical fiber 122 is greater than or equal to 4.5 weight percent.

System 100 preferably includes an optical pumping system delivering power to optical fiber 122. Optical pumping subsystem 110 includes one or more pumping fiber lasers 102 doped with thulium. The optical pumping subsystem 110 is in optical communication with the pump lens 103. The pump lens 103 is in optical communication with the dichroic mirror 104. The dichroic mirror 104 is coated with a multi-layer dielectric to reflect certain wavelengths and pass certain other wavelengths. The dichroic mirror 104 is in optical communication with the input lens 105. The input lens 105 is in optical communication with an undoped fiber section 123 having core and cladding diameters matched to the optical fiber 122. In some embodiments, the undoped fiber 123 is based on silica glass and experiences no heating from the lasing process.

Optical pumping subsystem 120 also delivers power to optical fiber 122. Optical pumping subsystem 120 may include one or more pumping fiber lasers 112 doped with thulium. The optical pumping subsystem 120 is in optical communication with the pump lens 113. The pump lens 113 is in optical communication with the dichroic mirror 114. The dichroic mirror 114 is in optical communication with the output lens 115.

The output lens 115 is in optical with an undoped fiber 124 having core and cladding diameters matched to the optical fiber 122. In some embodiments, the undoped fiber 124 is based on substantially of pure silica glass material and experiences substantially no heating from the lasing process loss as a result.

In operation, an input laser beam 101 is impinged upon the dichroic mirror 104. The input laser beam 101 at a wavelength that is longer than 2000 nm is directed by the dichroic mirror 104 to impinge upon input lens 105. Dichroic mirror 104 is coated for high reflectivity at the wavelength of input laser beam 101. Input lens 105 focuses the input laser beam 101 into the core of the undoped fiber 123. The undoped fiber 123 is spliced to the doped optical fiber 122 and thus the power from the input laser beam 101 enters into the core of optical fiber 122. In some embodiments, input laser beam 101 delivers power to the core of optical fiber 122 at a wavelength of 2037 nm.

The one or more pumping fiber lasers 102 operate to impinge delivered power upon pump lens 103. The one or more pumping fiber lasers 102 operate at a wavelength that is shorter than the wavelength delivered by input laser beam 101 at which optical fiber 122 operates. In some embodiments, the one or more pumping fiber lasers 102 operate at a wavelength of 1940 nm as discussed above with reference to FIG. 1. In some embodiments, the one or more pumping fiber lasers 102 operate at a wavelength of 1980 nm. Pump lens 103 focuses the delivered power through dichroic mirror 104. Dichroic mirror 104 is coated for high transmission at the wavelength of the one or more pumping fiber lasers 102.

After passing through dichroic mirror 104, the power delivered from the optical pumping system 110 impinges upon input lens 105. Input lens 105 focuses the power delivered from optical pumping system 110 into undoped fiber 123. In some embodiments the power from the optical pump system 110 is focused into the cladding of the undoped fiber 123. The undoped fiber 123 directs the power delivered from optical pumping system 110 into the cladding of optical fiber 122. In various embodiments, the power from the optical pump system 110 is focused into the core of the undoped fiber 123. The undoped fiber 123 directs the power delivered from optical pumping system 110 into the core of optical fiber 122. The power delivered from optical pumping system 110 pumps the thulium-doped core of optical fiber 122, which amplifies the input laser beam 101.

The one or more pumping fiber lasers 112 operate to impinge delivered power upon pump lens 113. The one or more pumping fiber lasers 112 operate at a wavelength that is shorter than the wavelength delivered by input laser beam 101 at which optical fiber 122 operates. In some embodiments, the one or more pumping fiber lasers 112 operate at a wavelength of 1940 nm as discussed above with reference to FIG. 1. In some embodiments, the one or more pumping fiber lasers 112 operate at a wavelength of 1980 nm. Pump lens 113 focuses the delivered power through dichroic mirror 114. Dichroic mirror 114 is coated for high transmission at the wavelength of the one or more pumping fiber lasers.

After passing through dichroic mirror 114, the power delivered from the optical pumping system 120 impinges upon output lens 115. Output lens 115 focuses the power delivered from optical pumping system 120 into undoped fiber 124. In some embodiments the power from the optical pump system 120 is focused into the cladding of the undoped fiber 124. The undoped fiber 124 directs the power delivered from optical pumping system 120 into the cladding of optical fiber 122. In various embodiments, the power from the optical pump system 120 is focused into the core of the undoped fiber 124. The undoped fiber 124 directs the power delivered from optical pumping system 120 into the core of optical fiber 122. The power delivered from optical pumping system 120 pumps the thulium-doped core of optical fiber 122, which amplifies the input laser beam 101.

The amplified power of input laser beam 101 forms output last beam 111 inside the core of optical fiber 122. Heat sink 121 removes heat generated in the optical fiber 122. Output laser beam 111 is directed through undoped fiber 124 to exit optical fiber 124. Output laser beam 111 impinges upon output lens 115. Output lens 115 focuses output laser beam 111 to impinge upon dichroic mirror 114. Dichroic mirror 114 is coated for high reflectivity at the wavelength of output laser beam 111, e.g., 2037 nm as discussed above with reference to FIGS. 1-3. At this wavelength, the transmission coefficient through the atmosphere is greater than 0.97 as shown in FIGS. 2-3.

Figure 10:
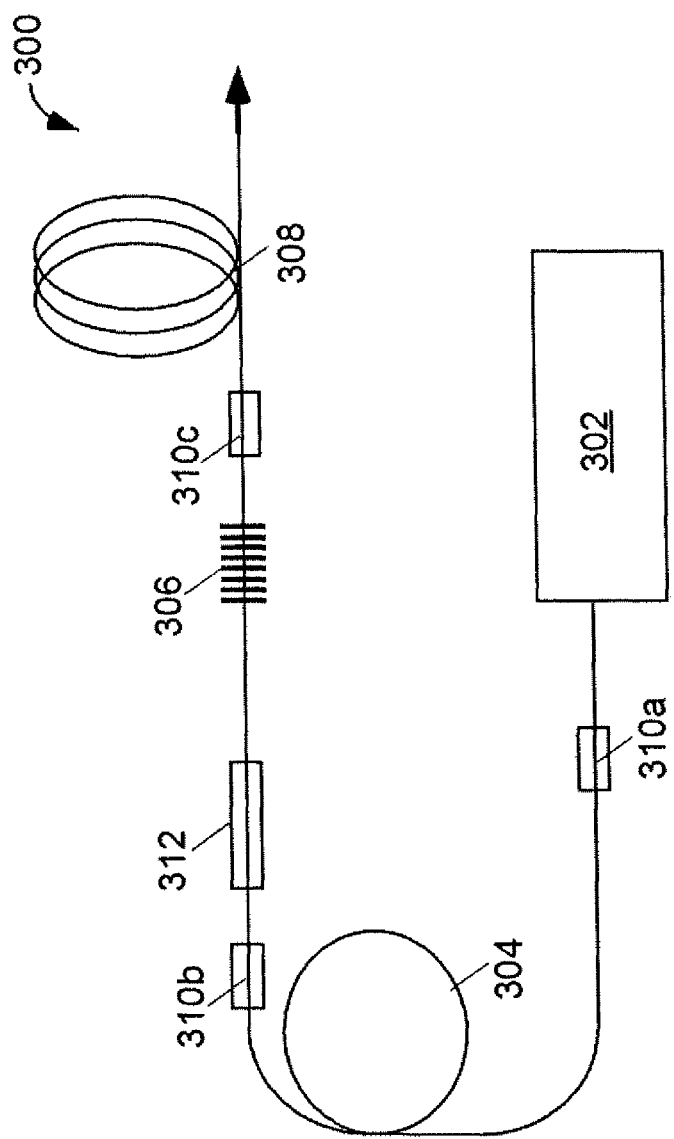
FIG. 10 is a schematic representation of several components of a low quantum defect thulium-doped fiber laser according to an illustrative embodiment of the invention.

FIG. 10 is a schematic representation of a low quantum defect thulium-doped fiber laser 300 according to another illustrative embodiment of the invention. The fiber laser 300 includes a fiber laser source 302, an undoped fiber 304, a fiber-based high reflector 306, and a thulium-doped fiber 308.

Fiber laser source 302 is in optical communication with a splice 310a. Splice 310 is in optical communication with the undoped fiber 304. Undoped fiber 304 is in optical communication with a splice 310b. Splice 310b is in optical communication with a clad mode stripper 312. Clad mode stripper 312 is in optical communication with the fiber-based high reflector 306. High reflector 306 is in optical communication with a splice 310c. Splice 310c is in optical communication with the thulium-doped fiber 308.

In operation, fiber laser source 302 is thulium-doped and delivers power to the core of thulium-doped fiber 308 at a wavelength of 1940 nm. The power delivered from fiber laser source 302 passes through splice 310b and enters undoped fiber 304. Undoped fiber 304 may be 1 m in length and has a 25 um core. The power delivered from fiber laser source 302 exits undoped fiber 304 and passes through spice 310b. After passing through splice 310b, the power delivered from fiber laser source 302 enters clad mode stripper 312. Clad mode stripper 312 is a removes any spurious power from the cladding of the fiber 304.

The power delivered from fiber laser source 302 then exits clad mode stripper 312 and enters high reflector 306. High reflector 306 is consists of a fiber Bragg grating designed for high reflectivity at 2037 nm and high transmission at 1940 nm. The power delivered from fiber laser source 302 exits high reflector 306 and enters splice 310c. Upon exiting splice 310c, the power delivered from fiber laser source 302 enters thulium-doped fiber 308.

Thulium-doped fiber 308, in this example, is a 10 m length of silica fiber, core-doped at a concentration of 4.5 weight percent, at operating at a wavelength of 2037 nm to achieve low-quantum-defect. Thulium-doped fiber 308 has a cleaved, uncoated end, acting as a partial-reflector mirror, to form an optical cavity with the fiber 308, splice 310c and high reflector 306. The resulting output power is at a wavelength of 2037 nm, with a residual unabsorbed pumping power at a wavelength of 1940 nm. The amplifier models show that a 10 m fiber would have enough gain to match this loss of the optical cavity at a pump power of 4.9 W. Therefore, laser action above this pump level is expected. With an output wavelength of 2037 nm, the transmission coefficient through the atmosphere is greater than 0.8 (e.g., 0.97) as shown in FIGS. 2-3.

Figure 11:
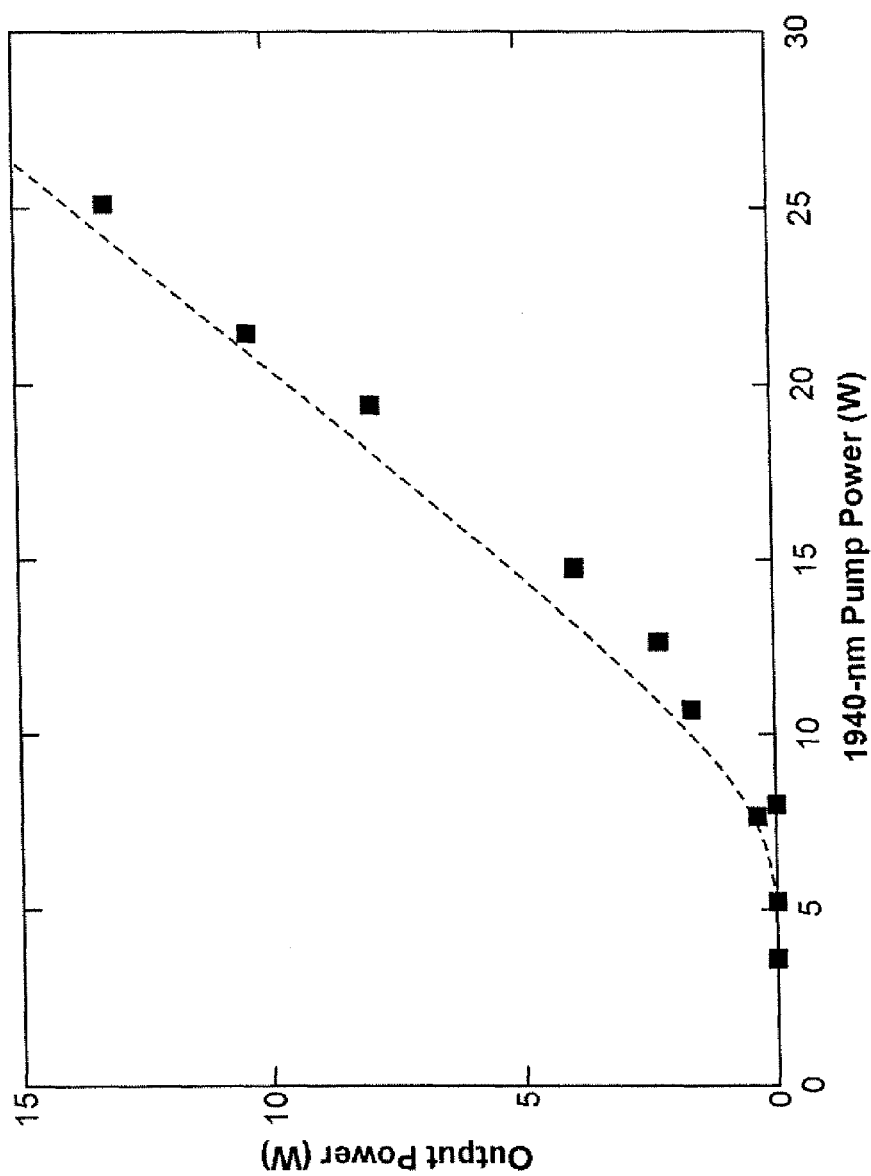
FIG. 11 is a graph showing power output of a low quantum defect thulium-doped fiber laser over pump power at a wavelength of 1940 nm according to an illustrative embodiment of the invention.

FIG. 11 is a graph showing power output of a low quantum defect thulium-doped fiber laser over pump power at a wavelength of 1940 nm according to an illustrative embodiment of the invention. The dashed line in FIG. 11 is the predicted output of the amplifier model, calculated with 5 mW of input power. The plotted points in FIG. 11 are the actual laboratory results obtained from operating the laser described in FIG. 10. At 25 W of 1940 nm wavelength pump power, the predicted output of the model is approximately 13.8 W. At 20 W of 1940 nm wavelength pump power, the actual output is approximately 13 W.

The invention can be used for developing a low-quantum-defect thulium-doped fiber laser that reduces the fractional amount of heat generated in the thulium-doped fiber for a given output power, significantly raising the limit to the output power set by thermal effects in the thulium-doped fiber. The invention can also be used for designing a low-quantum-defect thulium-doped fiber laser operating at 2037 nm and pumped at 1940 nm by one or multiple conventional-design thulium-doped fiber lasers. The invention can also be used for achieving high power and high efficiency in directed energy systems, laser radar, or laser materials processing applications, such as high-speed metal cutting and welding.

Figure 12:
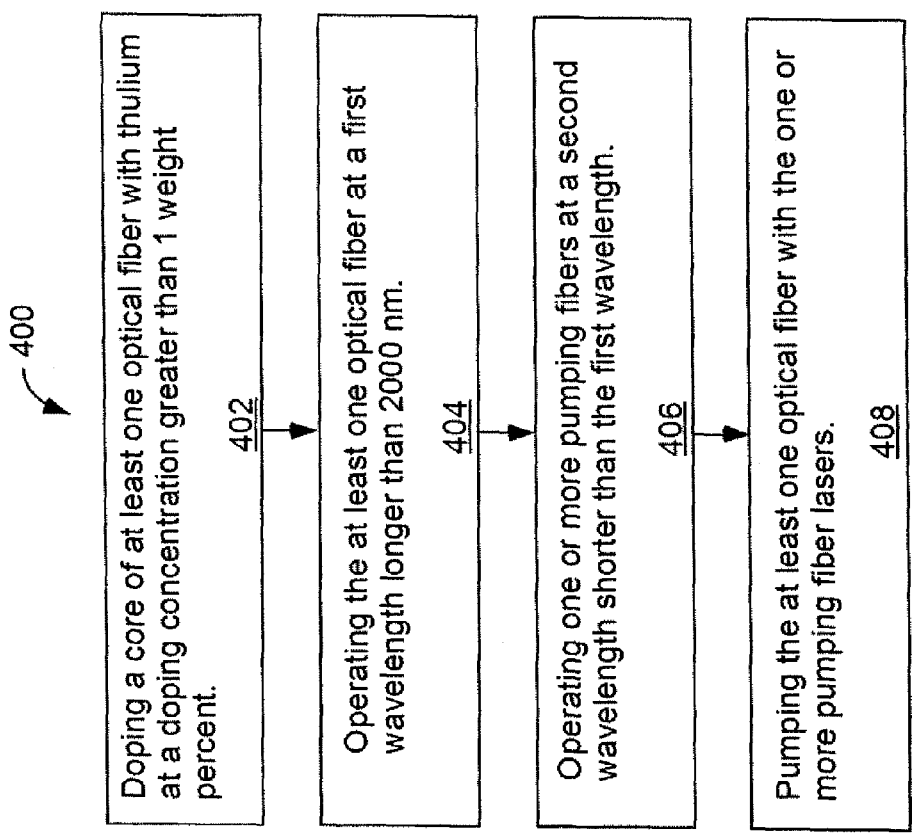
FIG. 12 is a flow chart showing a method for efficiently generating high power in a fiber according to an illustrative embodiment of the invention.

FIG. 12 is a flow chart showing a method for efficiently generating high power in a fiber, according to an illustrative embodiment of the invention. The method involves doping a core of at least one optical fiber (e.g., optical fiber 122, FIG. 8 or 308, FIG. 10) with thulium at a doping concentration greater than 1 weight percent (Step 402). In various embodiments, doping the core of the at least one optical fiber comprising silica with thulium is done at a doping concentration greater than or equal to 4.5 weight percent.

Figure 9:
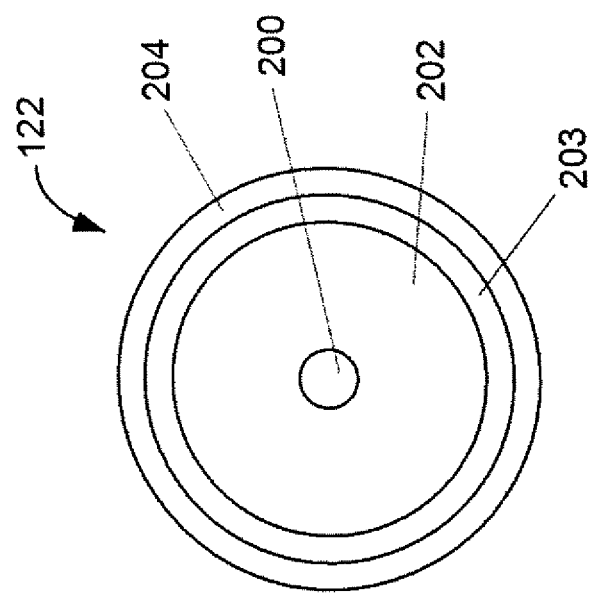
FIG. 9 is a cross sectional view of the optical fiber shown in FIG. 8.

The method also preferably involves operating the at least one optical fiber at a first wavelength longer than 2000 nm (Step 404). The method also preferably involves operating one or more pumping fibers (e.g., the one or more pumping fiber lasers as shown in FIGS. 9-10) at a second wavelength shorter than the first wavelength (Step 406).

The method also involves pumping the at least one optical fiber with the one or more pumping fiber lasers (Step 408). In some embodiments, pumping the at least one optical fiber with the one or more pumping fiber lasers further involves delivering power to the at least one optical fiber via the core. In various embodiments, pumping the at least one optical fiber with the one or more pumping fiber lasers further involves delivering power to the at least one optical fiber via a cladding surrounding the core.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A fiber laser system comprising:
    at least one optical fiber comprising a core and a cladding and operative at a first wavelength larger than 2000 nm;
    at least one optical pumping system including one or more pumping fiber lasers doped with thulium for pumping the at least one optical fiber and operative at a second, shorter wavelength close to the first wavelength for low quantum defect pumping; and
    the core of the at least one optical fiber doped with thulium at a doping concentration greater than one weight % to reduce the effects of absorption losses in the core.

2. The fiber laser system of claim 1 wherein the doping concentration of the optical fiber is greater than or equal to 4.5 weight percent.

3. The fiber laser system of claim 1 wherein the at least one optical fiber further comprises silica.

4. The fiber laser system of claim 1 wherein the first wavelength is 2037 nm.

5. The fiber laser system of claim 1 wherein the second wavelength is 1940 nm.

6. The fiber laser system of claim 1 wherein the second wavelength is 1980 nm.

7. The fiber laser system of claim 1 wherein the at least one optical pumping system delivers power to the at least one optical fiber via the core.

8. The fiber laser system of claim 1 wherein the at least one optical pumping system delivers power to the at least one optical fiber via the cladding.

9. A method of efficiently generating high power in an optical fiber comprising:
    operating the at least one optical fiber at a first wavelength larger than 2000 nm;
    pumping said optical fiber using one or more pumping fiber lasers operative at a second wavelength shorter than the first wavelength close to said first wavelength for low quantum defect pumping; and
    the core of the at least one optical fiber doped with thulium at a doping concentration of greater than one weight % to reduce absorption losses in the core.

10. The method of claim 9 wherein pumping the at least one optical fiber with the one or more pumping fiber lasers further comprises delivering power to the at least one optical fiber via the core.

11. The method of claim 9 wherein pumping the at least one optical fiber with the one or more pumping fiber lasers further comprises delivering power to the at least one optical fiber via a cladding surrounding the core.

12. A method of efficiently generating high power in a fiber comprising:
    pumping at least one optical fiber with one or more pumping fiber lasers;
    operating the at least one optical fiber at a first wavelength longer than 2000 nm wherein the core of at least one optical fiber comprises silica doped with thulium at a doping concentration greater than or equal to 4.5 weight percent; and operating the one or more pumping fiber lasers at a second wavelength shorter than the first wavelength.

* * * * *